(No Model.)

G. MOSS.
DEVICE FOR OBVIATING DEAD CENTERS.

No. 355,705. Patented Jan. 11, 1887.

Witnesses.
John C. Perkins
Eugene C. Southard

Inventor.
Gilbert Moss
By Lucius C. West
Atty.

UNITED STATES PATENT OFFICE.

GILBERT MOSS, OF THREE OAKS, MICHIGAN.

DEVICE FOR OBVIATING DEAD-CENTERS.

SPECIFICATION forming part of Letters Patent No. 355,705, dated January 11, 1887.

Application filed March 31, 1886. Serial No. 197,277. (No model.)

*To all whom it may concern:*

Be it known that I, GILBERT MOSS, a subject of the Queen of Great Britain, residing at Three Oaks, county of Berrien, State of Michigan, have invented a new and useful Mechanical Movement for Obviating Dead-Centers, of which the following is a specification.

This invention consists in a mechanical construction for converting reciprocating motion to rotary motion.

The main object of the invention is to obviate dead-centers.

Figure 1:
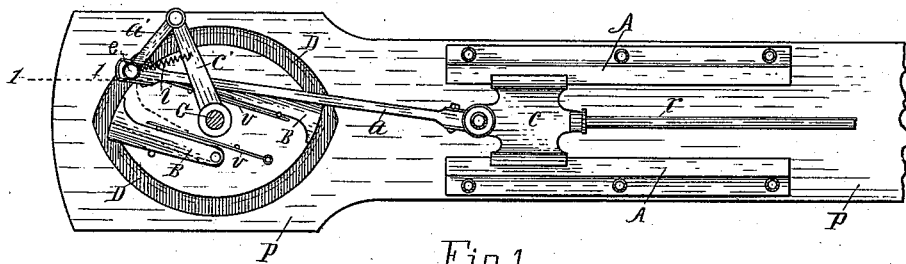
Figure 5:
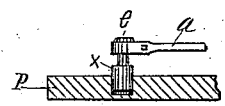
Figure 2:
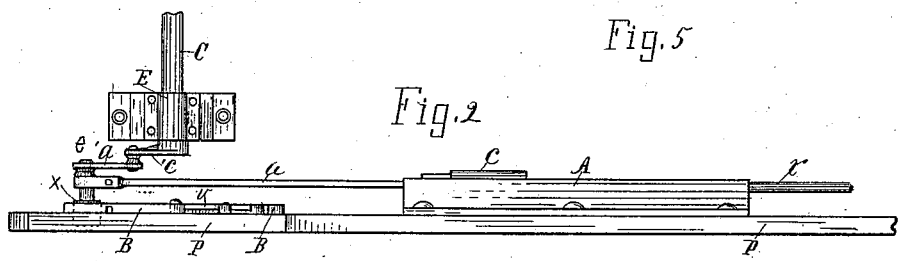
Figure 3:
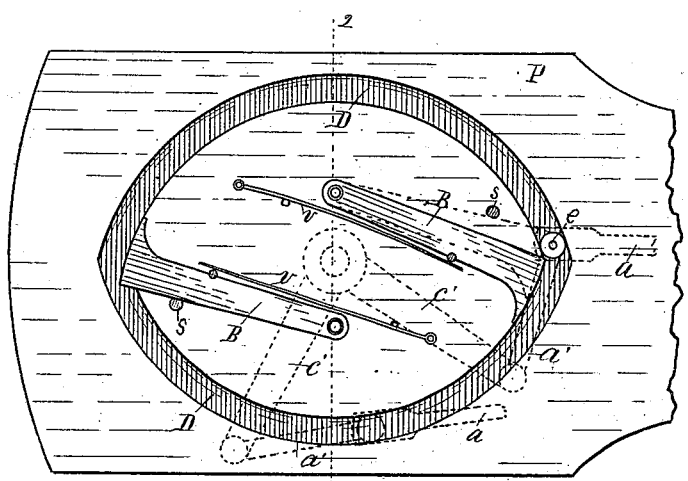
Figure 4:
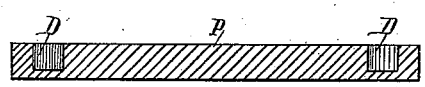

In the drawings, forming a part of this specification, Figure 1 is a plan view; Fig. 2, a side elevation of Fig. 1; Fig. 3, an enlarged plan of left-hand end of Fig. 1; Fig. 4, a section on line 2 2 in Fig. 3; and Fig. 5, details of parts in Fig. 2, referred to by like letters, the part P being in section.

Referring to the letters of reference marked on the drawings, P represents the top of a suitable support to the mechanism. At $r$ an engine-piston is shown, having the ordinary slide-bearings, C A. These parts are merely introduced to show a means of power and to illustrate reciprocating motion.

Of course the invention is not confined to any given power. It will be found useful in connection with wind-wheels and other power means. The reciprocating rod or piston $r$ is connected with the crank $c'$ of the rotatable shaft C by means of a pitman composed of two parts, $a\ a'$, said parts being jointedly connected by the pivot $e$. The end arm, $a'$, of the pitman is at an angle to the main part $a$. Just what particular angle is not material, as it depends on the length of parts.

The pivot $e$ has guide-bearings in the oblong slot D. The lower end of the pivot $e$ may be provided with a roller, $x$, to play in the slot D, if preferred; or the roller may be dispensed with.

The oblong slot D represents two opposite arcs of a circle joined at the ends. Thus when the pivot $e$ gets at the end of one of the arcs it at once goes back to the point of starting by traversing the other arc. This guide-slot also acts as a wedge giving power in connection with arm $a'$. At the ends of the guide-slot D are spring-actuated dogs B, so formed that their outer rear corners extend over the slot, as at left hand in Fig. 3. Thus the pivot $e$ in its transit contacts with the dog B, as at right hand in Fig. 3, forcing it out of its plane, and after passing it said dog is forced back by spring $v$ (or equivalent) against stop S, thus closing the path of the pivot $e$ against a receding movement of said pivot.

The dotted positions of parts in Fig. 3 show the operation. In some cases dogs may not be needed. Of course if there were any dead-centers the points where they would occur would be at each end of the guide-slot, when the pitman $a$ was on a straight line with the piston; but when the pitman $a$ is in this position the end of the crank $c'$ of the rotary shaft C has been carried by the center by means of the jointed arm $a'$ of the pitman proper. So accurately does this movement work that the power required to rotate the shaft C is nearly if not precisely the same at whatever point the pivot $e$ may be in the slot D, and the movement starts just as easily from one position of rest as from another. Such being the case, there can be no dead-centers. This invention shows that the old rule "that an increase in power necessitates an increase in motion" will not always hold true. When using the movement in a windmill and the like, a loose balance-wheel should be employed with ratchet and grip.

The device in Fig. 1 is described as a plan view; but it will serve equally well to show a side elevation when constructed in this position. In short, the invention will work in any position and at any angle. The guide-slot here shown consists in a groove in part P; but it will appear obvious that an oblong guideway for one end or the other of the pivot $e$ to traverse may be formed of bent bars of metal and in various ways not necessary to illustrate here.

Having thus described my invention, what I claim as new is—

1. A mechanical movement for obviating dead-centers, comprising, in combination, a rotary crank-shaft, a reciprocating rod or pitman, an arm pivotally connecting with the crank and pitman and at an angle to said pitman, an oblong guideway traversed by the pivot of the arm and pitman, and spring-actuated dogs at the ends of the guideway, which permit the forward passage of said pivot, but prevent its receding over the same plane, substantially as set forth.

2. A mechanical movement for obviating dead-centers, comprising, in combination, a crank-shaft, a reciprocating rod, an arm pivoted to the crank and reciprocating rod and at an angle to said rod, and an oblong guideway traversed by a projection from the connected ends of the arm and reciprocating rod, substantially as set forth.

In testimony of the foregoing I have hereunto subscribed my name in presence of two witnesses.

GILBERT MOSS.

Witnesses:
JOHN M. PAXSON,
GEORGE MAZE.